July 13, 1926. 1,592,512
W. G. ALLAN
ELECTROLYTIC APPARATUS
Original Filed April 8, 1921   7 Sheets-Sheet 2
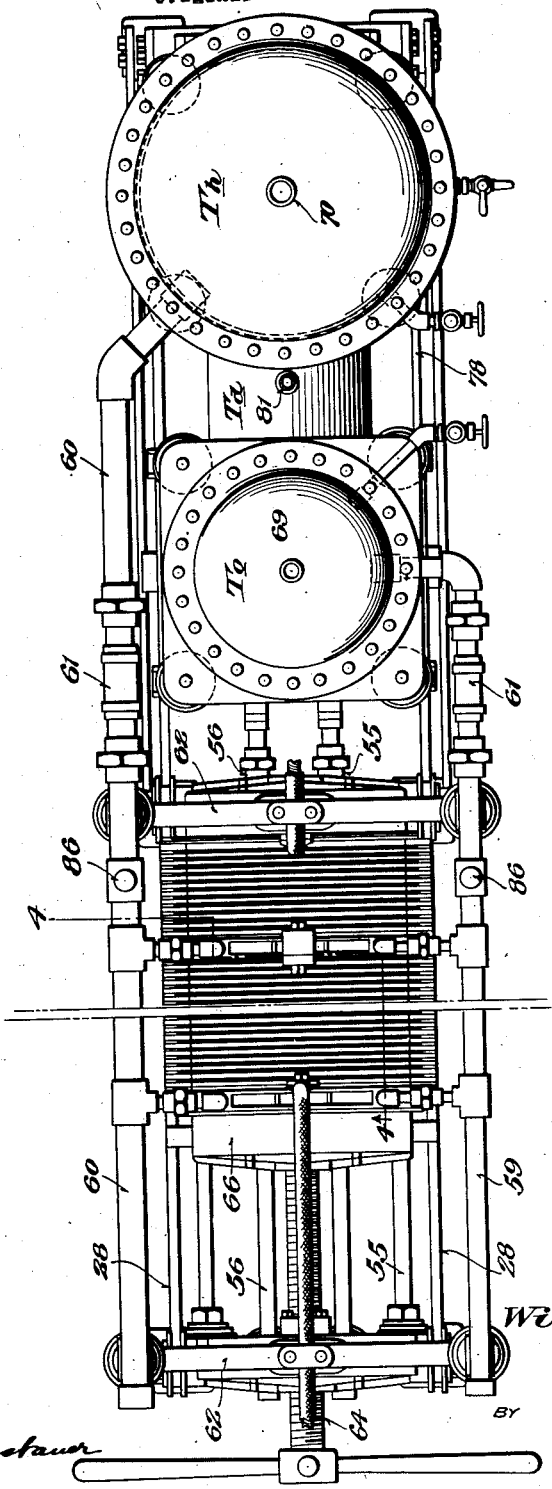
Inventor
William G. Allan,
BY
his Attorney

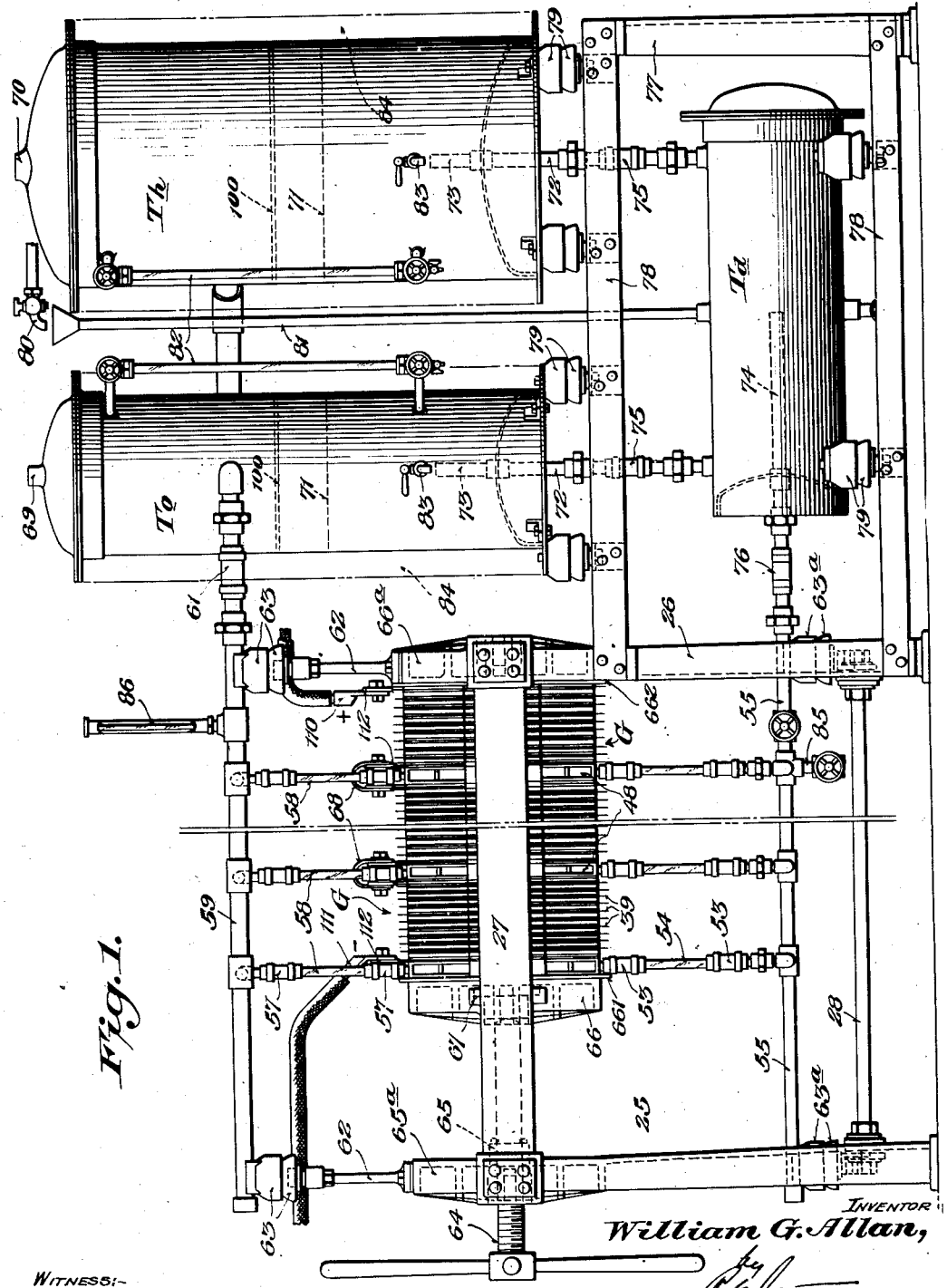

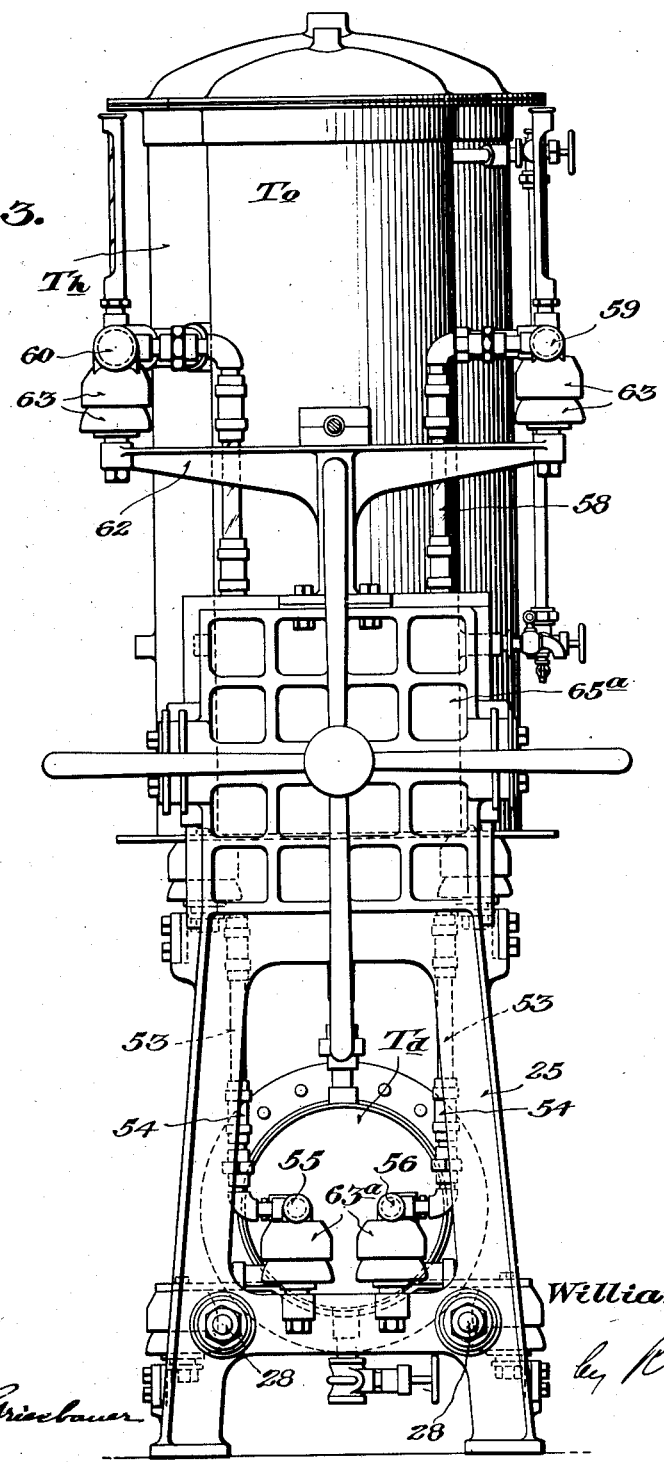

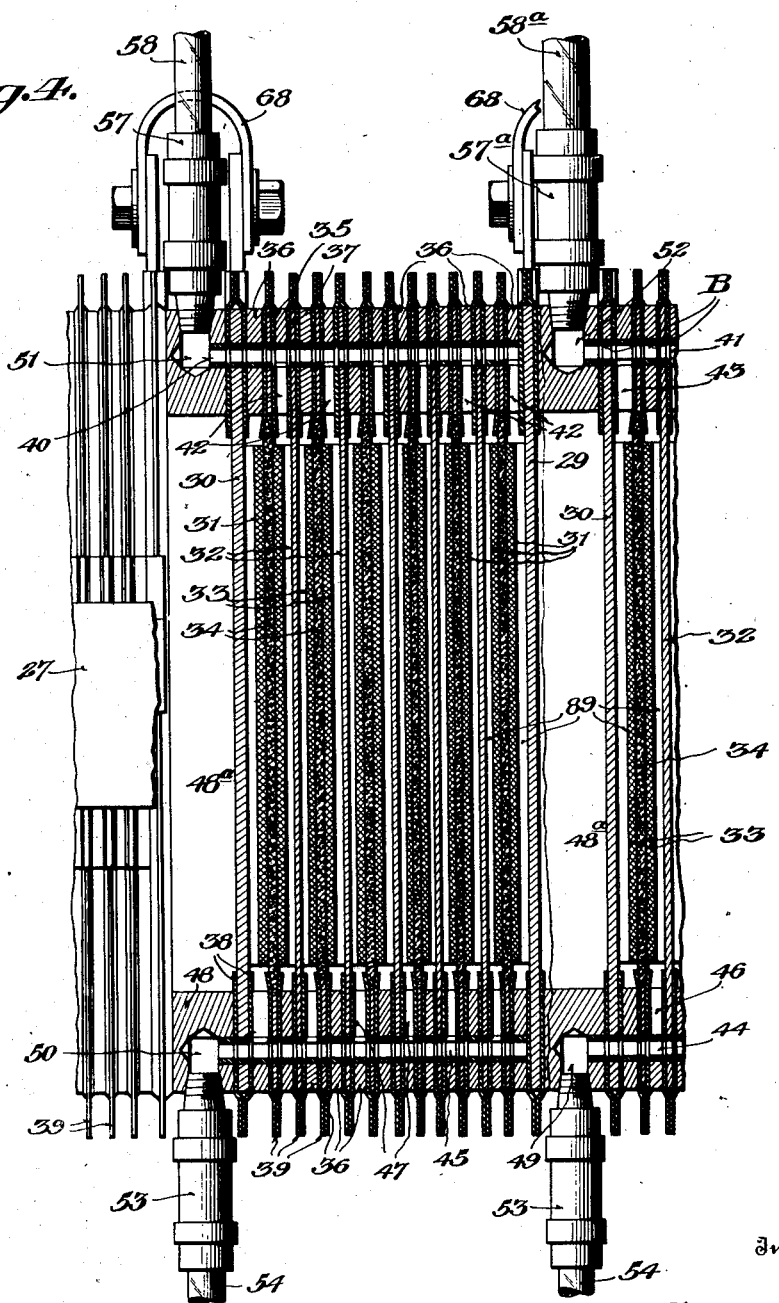

July 13, 1926. 1,592,512
W. G. ALLAN
ELECTROLYTIC APPARATUS
Original Filed April 8, 1921    7 Sheets-Sheet 5
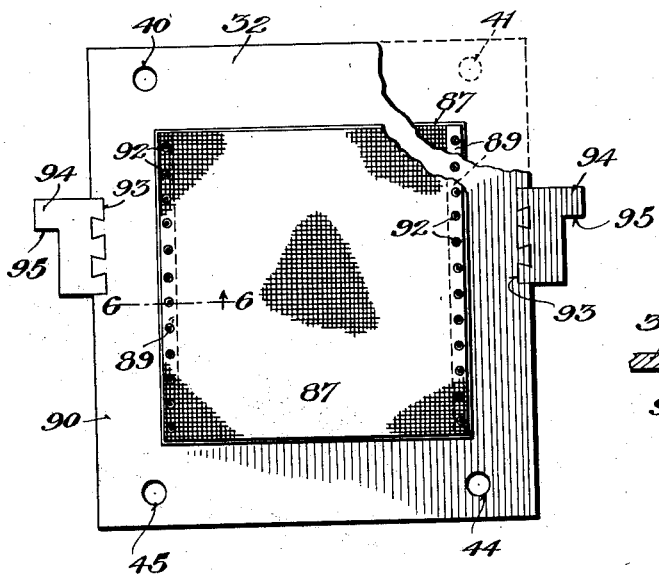
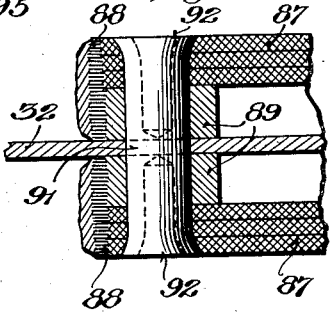
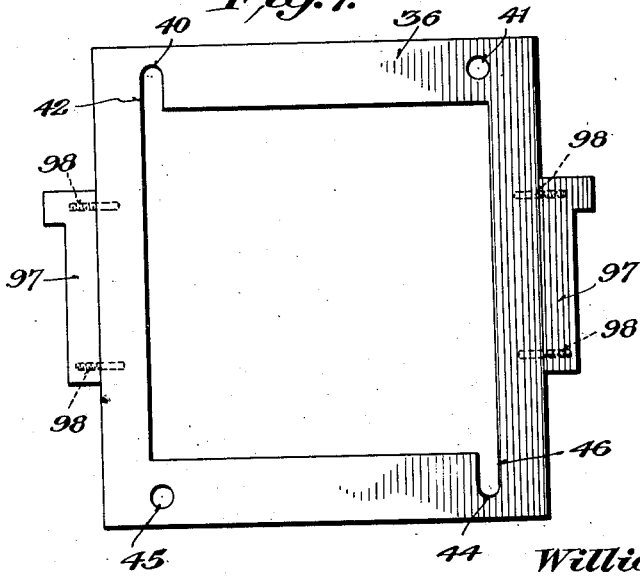
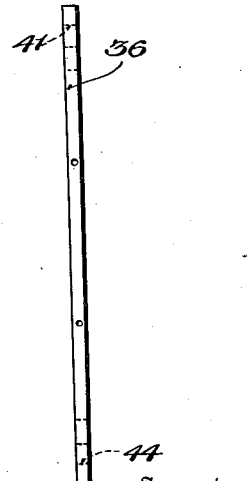
Inventor
William G. Allan, July 13, 1926.

W. G. ALLAN 1,592,512

ELECTROLYTIC APPARATUS

Original Filed April 8, 1921   7 Sheets-Sheet 6

Inventor
William G. Allan,
By
his Attorney

WITNESS:—

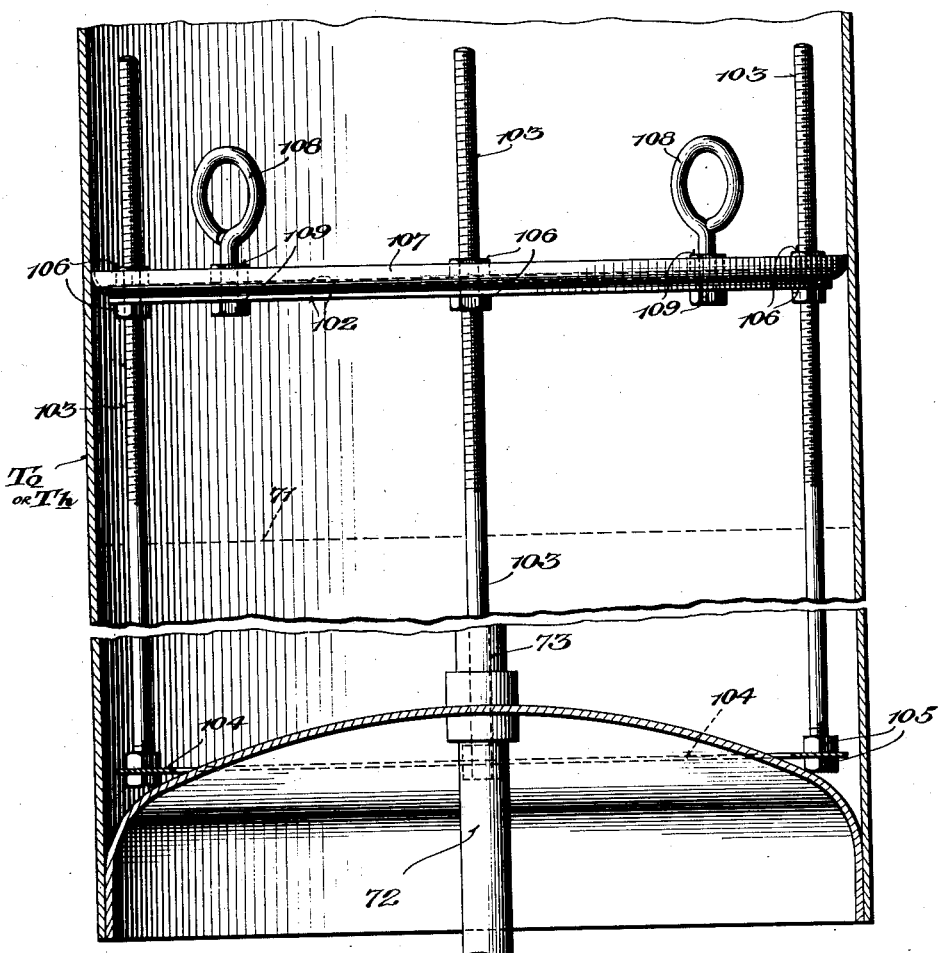
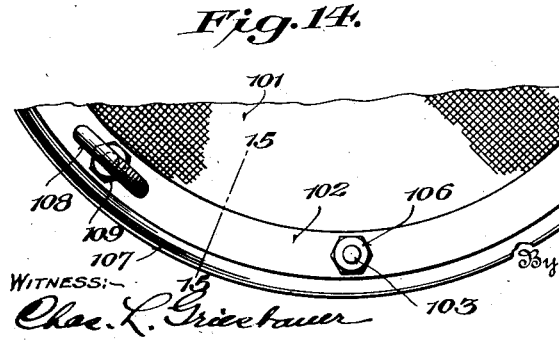
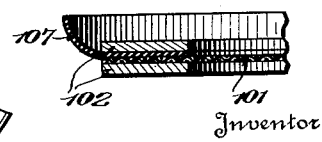

Patented July 13, 1926

1,592,512

UNITED STATES PATENT OFFICE.

WILLIAM GEORGE ALLAN, OF TORONTO, ONTARIO, CANADA, ASSIGNOR, BY MESNE ASSIGNMENTS, TO FARLEY G. CLARK.

ELECTROLYTIC APPARATUS.

Application filed April 8, 1921, Serial No. 459,585. Renewed December 7, 1925.

This invention relates to electrolytic apparatus; and it relates more particularly to apparatus adapted for electrolytic generation of hydrogen and oxygen from water, although it is to be understood that the invention in its broader aspects is not restricted to apparatus adapted for this particular purpose.

In general, the object of the invention is to provide electrolytic apparatus built up of a plurality of standard parts which are comparatively simple and economical to manufacture and which can be readily assembled into a generator or analogous battery construction, and also readily disassembled when necessary to effect repairs or replacements. A further object of the invention is to provide apparatus of increased operating efficiency as compared to apparatus heretofore known. Other objects of the invention, as well as various novel features thereof and advantages attained thereby, will be apparent from the description hereinafter.

One of the important features of the present invention is the provision of a generator or battery construction which can be considered a modification or adaptation of the well-known filter-press type, exemplified in an early form by the German patent to Schmidt 111,131. According to the present invention, a plurality of cells comprised in what may be generally termed a filter-press type of generator are divided into a plurality of groups or units, each of which groups or units comprises a number of cells assembled and cooperating on the filter-press principle; and the several units being mechanically held together in the complete generator in much the same manner as are the individual cells of the usual filter-press generator. However, the component units of the resultant assemblage are capable of functioning individually of each other; and as regards flow of electrolyte and gases, the several units are disposed in parallel between the supply piping and the offtake piping, in contrast to the series relation of the entire plurality of cells in the ordinary filter-press generator. As regards current flow, component cells of each unit or group are in series electrically; while the units themselves may be arranged electrically either in series or in parallel. Usually, and in the specific embodiment of the invention shown and described, the units are arranged electrically in series.

Another important feature of the invention is the provision of a generator construction wherein the arrangement of the piping associated with the cells is such that any of the component cell groups or units can be readily disconnected and removed from the assemblage without dismantling the whole apparatus or even disturbing the connections of the other groups or units; this being accomplished with but slight interruption to operation. This is obviously a feature of great advantage.

Still another important feature of the invention, which is of general application in the art and which can be associated with types of generators and batteries other than those of the filter-press type, is the provision of what may be termed a re-diffusion tank into which anolyte and catholyte go first from the gas-separating chambers or tanks before being returned to the cells. The provision of an additional or supplemental chamber or tank, termed above a re-diffusion tank, makes it possible to properly mix and recombine the gas-free anolyte and catholyte into an electrolyte of uniform concentration which can then be returned to the cell compartments for further electrolytic treatment.

Various other novel features of construction and operation will be pointed out as the description proceeds.

In order to afford an understanding of the principles underlying the invention, a practical embodiment thereof, illustrated in the accompanying drawings, will be described in detail for the sake of a concrete example illustrating a practical construction coming within the scope of the invention.

In these drawings,

Fig. 1 is a side elevation of a generator installation embodying the principles of the invention, the view being interrupted and shortened, as shown, to bring it within the permissible limits of the drawings;

Fig. 2 is a top plan of said installation; similarly shortened;

Fig. 3 is an end elevation;

Fig. 4 is a vertical section on a larger scale on the line 4—4 of Fig. 2, illustrating details of the cell construction;

Fig. 5 is a front or face view of one of the bipolar electrode devices;

Fig. 6 is a detail section on the line 6—6 of Fig. 5 on a larger scale;

Figs. 7 and 8 are a front and edge view, respectively, of one of the annular cell frames;

Fig. 13 is a vertical section through one of the separating tanks showing in elevation a de-foamizer device therein and a convenient form of mounting for the same;

Fig. 14 is a partial top plan view of Fig. 13, and

Fig. 15 is a detail section on the line 15—15 of Fig. 14.

Figure 9:
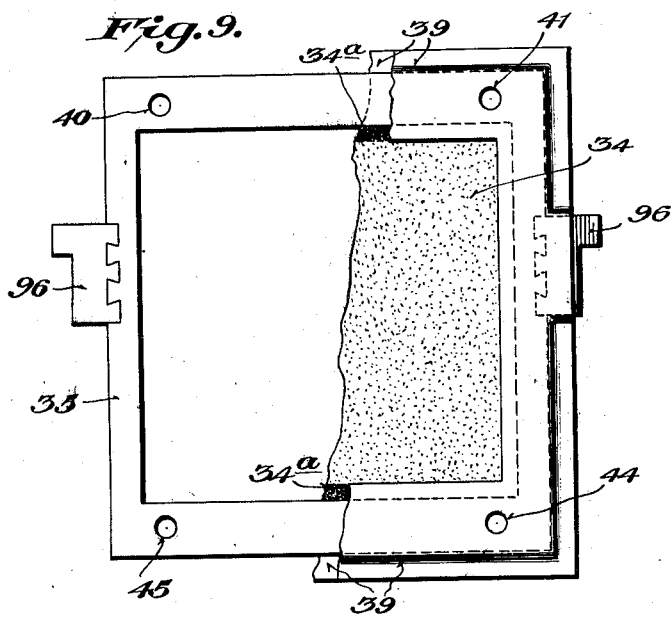
Fig. 9 is a front view, partly broken away, of a diaphragm assembled with its supporting frame.

Referring to the drawings, G designates generally the generator or battery of cells; $T_o$ and $T_h$ are the anolyte and catholyte separating tanks, respectively, into which gas-laden anolyte and catholyte are respectively discharged from the cells; and $T_d$ is a re-diffusion or mixing tank into which separated anolyte and catholyte flow from $T_o$ and $T_h$, respectively, and from which, after intermingling, they are led back to the cell compartments of the generator G.

The generator G comprises a plurality of cell-forming elements suitably assembled and supported upon a frame-work comprising end portions 25 and 26, the upper portions of which are connected by a pair of spaced side bars 27, between which latter the cell-forming members are disposed and upon which they are supported in a manner to be more fully described later. The lower portions of the end frame members 25, 26 are connected by a pair of tension bolts 28. As it is desirable throughout the entire installation to avoid providing continuous metallic paths between points of differing potential, by which current losses would occur and the operating efficiency of the installation would be lessened, and also to aid in preventing grounds, the side bars 27 and bolts 28 are best insulated from the members 25, 26 of the frame in any suitable manner unnecessary to describe in detail here.

The cell-forming members supported on the frame are so constructed and assembled as to provide a plurality of cell groups or units which are substantially independent of each other both structurally and functionally in many respects, although associated mechanically as a unitary assemblage in the complete generator. As many groups or cell units may be comprised in the installation, as are desired; and each group or unit may comprise as many individual cells as are necessary or convenient. In the present example, each cell group or unit comprises five complete cells and two half-cells at the ends of the group, as will now be more fully described in connection especially with Fig. 4. In the construction illustrated, each cell group is included between end walls 29 and 30, which may be of any suitable material but which are desirably made of sheet steel. Each of the end walls 29, 30, carries an electrode device 31. Arranged at uniform intervals in the space between the end walls 29, 30, are five electrode-supporting plates or backing plates 32, each of which carries on its opposite faces a pair of electrode devices 33. Between adjacent pairs of electrode devices 33, and also between each of the electrode devices 31 and the respectively adjacent electrode device 33, are interposed porous diaphragms 34, consisting for example of woven asbestos cloth. The space or chamber included between any two adjacent plates 32, or between either of the end plates 29, 30 and the nearest plate 32, constitutes a cell divided by the interposed diaphragm 34 into an anode compartment and a cathode compartment or half-cell; and as the cells are operated in series electrically, each of the plates 32 with its associated electrode devices 33 constitutes a bi-polar electrode structure. Each of the back plates 29, 30, with its associated electrode device 31, constitutes a unipolar electrode structure.

The parts constituting each cell group or unit are of such character and construction, and are so assembled, as to provide a construction of the filter-press type broadly speaking. The details of construction and arrangement whereby this is accomplished may vary widely within the scope of the invention. In the present instance, the porous diaphragms 34 are supported in flat annular metal frames or borders 35, the details of which are best shown in Fig. 9. Flat faced metal annuli or cell frames 36 form spacing members by which the alternately disposed diaphragm frames 35 and marginal portions 37 of the electrode-supporting plates 32 are maintained in proper spaced relation to provide the series of alternating anode and cathode half-cells or compartments comprised in the cell group; said cell frames 36 peripherally bounding the half-cells which, as shown, are thin flat chambers, rectangularly shaped in this instance. In order to confine the flow of current as far as is practically possible to the path through the electrolyte between the electrode members within the cell compartments, it is desirable in practice to insulate the electrode or backing plates, diaphragm frames, and annular spacing members, from each other and from the end plates 29, 30. Any convenient means may be employed for accomplishing this object and at the same time insuring tight joints between the cell-forming parts, but in the present instance annular sheets 38, of soft rubber or other suitable insulating material, constitute insulating and packing gaskets arranged in pairs on opposite faces of the assembled members at the outer periphery of the cells. Most desirably these annular insulating gaskets are of such ample width that they extend inwardly for a short distance into the cell compartments, and also extend outwardly beyond the outer surface of the cell group or unit for some distance. These outwardly projecting portions of the gaskets may desirably be cemented together in pairs as indicated at 39. This arrangement not only effectively insulates the assembled parts from each other and packs the joints, but it also interposes long high-resistance leakage paths to the passage of stray currents and thus materially cuts down the current losses from this source. Each pair of gaskets having a diaphragm frame 35 between them may serve also as means for holding a diaphragm 34 within said frame. Thus, as shown in Fig. 9, the inner edges of the two gaskets 39 may be cemented to the rubberized margin 34ª of the diaphragm.

Provision is made for separately conducting the anodic and cathodic products of electrolysis from the cells. Where the generator is employed for the electrolysis of water in the production of hydrogen and oxygen, oxygen will be liberated in the anode cell compartments and hydrogen in the cathode compartments. Assuming for example that current passes through the cells from right to left in Figs. 1 and 2, 29 is a unipolar anode plate and 30 is a unipolar cathode plate; and the half-cell compartments next to these plates will be anode and cathode compartments respectively. The half-cell compartments between these end compartments will of course be anode and cathode compartments in alternate arrangement. Each of the electrode backing plates, diaphragm frames, cell frames, and insulating gaskets, is so apertured adjacent the outer periphery of the cell group or unit that when the parts are assembled the apertures register to provide continuous offtake ducts 40 and 41; duct 40 opening into the upper part of all the anode compartments through passages 42 formed in alternate frame members 36, but having no connection with the cathode compartments; while on the other hand the conduit 41 opens into the upper part of all the cathode compartments through passages 43 formed in the remaining alternate frame members 36, but has no connection with the anode compartments.

For the purpose of supplying electrolyte to the anode and cathode compartments or half-cells of each cell group, the cell-forming members are also apertured in a manner similar to that above described to provide electrolyte supply ducts 44 and 45, respectively, supply duct 44 opening into the lower part of all the anode compartments through passages 46 formed in alternating spacing members or cell frames 36; while supply duct 45 is connected by passages 47 through said frames to all the cathode compartments. Insulating bushings B each of a thickness corresponding to that of the corresponding cell frame, backing plate, or diaphragm frame, may be used to line the ducts 40, 41, 44, 45 thereby to cut down stray current losses and reduce secondary electrolytic action.

Thus far the construction and assemblage of the cell parts resembles in a general way the well known filter-press type of construction.

It will be seen that in the construction illustrated, electrolyte entering the lower part of a cell by way of passage 46 or passage 47, as the case may be, is obliged to travel in a generally diagonal direction to the corresponding offtake passage 42 or 43. This ensures effective distribution of fresh electrolyte over the electrode surfaces and is the principal reason for employing separate electrolyte supply headers for the anode and cathode compartments, as will be described hereinafter. A single supply header, opening into both the anode and cathode compartments, may be employed within the broad scope of the invention. As shown, the cell frames 36 are all alike and by reason of their symmetry are interchangeable for use in both anode and cathode compartments.

The several cell groups or units comprised in a complete installation within the present invention are separated from each other by spacing members 48 of such character as to afford facility for making proper inlet and offtake piping connections to each cell group or unit. These spacing members 48, which may be termed intake and offtake frames, may assume various forms within the invention; but most desirably they consist of double-flanged webbed annular frames, as here shown, of a width ample to provide room for employment of relatively large size inlet and offtake piping connections. In the present instance there are two electrolyte supply inlets, 49 and 50, in each member 48, connected respectively through suitable apertures in the backing plate 30 with the supply duct 44 and supply duct 45. Similarly offtakes 51 and 52, provided in each of the members 48, are connected through suitable apertures in the end plate 30 with the anolyte duct 40 and catholyte duct 41, respectively. In view of the fact that the volume of hydrogen evolved is double that of the oxygen, it is necessary, if the ducts 40 and 41, and the cooperating offtake passages 51 and 52, are of the same capacity, which is convenient, that this capacity be ample to accommodate the flow of hydrogen and catholyte. The anolyte and oxygen offtake duct 40 and the outlet 51 may of course be of smaller capacity than is required for the catholyte and hydrogen; but for the sake of simplicity and of standardizing the parts for interchangeability, it is usually better to have the dimensions of both offtake ducts the same and to base the design for capacity on the requirement for hydrogen and catholyte.

It will be noted that, in contrast to end plate 30, end plate 29 is not apertured; and that the passage of electrolyte and gases through and from each of the several cell groups or units of the installation is entirely separate and distinct from every other group or unit.

Flexible couplings 53 of rubber hose or the like, cooperating with an interposed section 54 of glass tubing or the like, connect the supply inlets 49 and 50, respectively, with supply headers 55 and 56. Similarly, flexible coupling 57 and glass tube 58, connect the offtake passage 51 with the anolyte and oxygen offtake header 59; while a larger diameter coupling and glass tube 57$^a$, 58$^a$, connect offtake passage 52 with the catholyte and hydrogen offtake header 60. It is apparent that the cell groups or units are thus connected in parallel between the supply headers and the offtake headers. The anolyte and oxygen header 59 discharges into the upper part of the separating tank $T_o$, as shown, above the normal liquid level therein; while the catholyte and hydrogen headers 60 discharges similarly into the upper part of the separating tank $T_h$. The header connections to these separating tanks may advantageously include insulating sections 61. The offtake headers are supported on the arms of T-brackets 62 carried by the apparatus framework, from which brackets the headers are insulated by suitable insulators 63; and from Figs. 2 and 3 it will be seen that said offtake headers are supported somewhat outside of the vertical planes defining the opposite sides of the assembled cell groups constituting the generator.

The groups of cells are mechanically held together as a unitary generator by a compression screw 64, working in a stationary nut 65 provided in the stationary head 65$^a$ on the frame member 25 and operating upon a compression pad 66, slidably supported on side bars 27 by lugs 67, said lugs being preferably of insulating material. The cell-forming parts are thus held together under compression between the movable pad or plate 66 and a stationary head 66$^a$ secured to frame member 26. Plates 661 and 662 of suitable insulating material separate the pad 66 and head 66$^a$, respectively, from the cell-forming parts compressed between them. By virtue of the described arrangement, in case it is desired to remove and repair or replace any one of the cell groups, it is only necessary to loosen the compression screw 64, disconnect the jumpers 68 or other means electrically connecting that group in series with its neighbors, and to uncouple the inlet and offtake supply connections for the particular group in question, whereupon that group can be hoisted vertically up between the offtake headers, the arrangement of the latter providing ample clearance to permit this. In practice the component parts going to make up a cell group or unit become united quite firmly through vulcanization of the annular gaskets to the metal faces of the frames and backing plates, due to the heat generated; and hence any group can be lifted out as a unit. It will be noted that the separating tanks are arranged in tandem between the same clearance lines as the generator proper, which makes for compactness.

Because of the greater volume of hydrogen evolved, it is convenient, in order to avoid having to provide special means to equalize the pressure on both sides of the cell diaphragms, to have the piping and container system through and into which the hydrogen is to flow, of greater capacity than the piping and container system for oxygen. Accordingly, the header 60 is preferably larger than the header 59; and the separating tank $T_h$, in the upper part of which the separated hydrogen collects, is of correspondingly larger capacity than the separating tank $T_o$. This capacity relation may advantageously be continued in the piping, gas holders, etc. (not shown) into which the oxygen and hydrogen respectively pass after leaving the separating tanks through the gas outlets 69 and 70 with which their removable covers are respectively provided.

The normal water level in the system, including the separating tanks, is indicated at 71; in other words, this is the level of the electrolyte in the system when it is not operating. In operation, the rapid evolution of the gases, in conjunction with the thermal head resulting from heat generated in the cells, produces a water lift effect in the riser connections from the cell groups to the offtake headers 59 and 60, thereby bringing about a rapid circulation of electrolyte upward from the cells into said headers and thence over into separating tanks, where the gas-laden anolyte and catholyte give up the gas they carry and accumulate in the lower parts of the respective separating tanks. Each of these tanks is provided in its lower part with an electrolyte outlet 72 which may desirably extend upwardly through the bottom of the tank for a considerable distance as indicated at 73, the outflowing electrolyte thereby being compelled to enter the outlet pipe at a point well above the bottom of the tank, whereby ample space for sludge settlement is provided. The outlet pipes discharge into the re-diffusion or mixing tank $T_d$, from which electrolyte is conducted through outlet pipes 74 to the electrolyte supply headers 55 and 56, already referred to. The outlet pipes 74 may advantageously take liquid from the central part of the tank $T_d$, thus favoring thorough intermingling of the gas-free anolyte and catholyte before the combined electrolyte is returned to the cells. The piping connections of the tank $T_d$ to the separating tanks and the headers 55, 56, may desirably include insulating sections 75, 76, as shown. Said headers 55, 56, may be carried on suitable insulators 63$^a$.

While the particular arrangement of the three tanks relative to each other is not essential to the invention in its broader aspects, the disposition of the re-diffusion tank directly below the separating tanks in the manner illustrated offers practical advantages in certain respects, and permits mounting the assemblage compactly on the framework consisting of uprights 77, 26, and stringers 78, the tanks being most desirably insulated from the supporting framework by suitable insulators 79. Make-up water may be supplied to the re-diffusion tank from tap 80 or other suitable source of supply through inlet pipe 81. The gage glasses 82 of the separating tanks are desirably located closely adjacent, as indicated, so that the conditions of liquid level in both tanks can be directly compared with greatest facility. Draw-off cocks 83 may be provided in the separating tanks, if desired, for sampling or other purposes. The separating tanks may be provided externally with a layer of heat insulation indicated conventionally in dotted lines at 84; and the re-diffusion tank may be similarly equipped where conditions make this desirable. It is of advantage to operate with the electrolyte (e. g. caustic alkali solution) very hot. The heat insulation referred to aids in conserving the heat units developed in the cells. The piping system may be provided at a low point with a valved drain outlet indicated at 85, whereby the system may be drained to any necessary extent, whenever desired. Valves may also be provided in the piping at other convenient points unnecessary to illustrate in detail. Thermometers 86 in the offtake headers enable observation of the electrolyte temperature.

The particular character of the electrodes employed in the cells forms no essential part of the present invention in its broad aspects, but it is most desirable to make use of foraminous electrode elements mounted upon the cell walls or electrode-supporting plates but spaced away therefrom to permit free upward passage of gas and electrolyte between each foraminous active electrode element and such backing plate. Figs. 5 and 6 illustrate a suitable type of active electrode member consisting of triple-ply wire gauze or screen 87, the plies being compressed closely together, and having their edges united by fusion to form a stiffening border or frame as indicated at 88. Two opposite edges of said border are welded to underlying parallel metal spacing strips 89; and the assemblage, in the case of a bipolar electrode, is held rigidly in place upon and in good metallic contact with the cell wall or backing plate by means of studs 91 extending through the backing plate and having expanded hollow ends 92 gripping the multi-ply screen and thereby anchoring the two electrode devices of the bipolar electrode firmly to the backing plate or cell wall. When the electrode device is in position in the cell, the spacing strips 89 are disposed vertically. Fig. 5 also shows how the backing plate or cell wall can be supported in a simple and effective manner upon the side bars 27 of the frame supporting the generator. The vertical or lateral edges of the plate are dove-tailed as indicated at 93 to cooperate with the cooperating dove-tailed edge of a flat lug 94, the outer edge of which is angular as indicated at 95 to rest upon the upper edge of a side bar 27. Similar dove-tailed lugs 96 may be employed to support the diaphragm frames on the side bars 27, as shown in Fig. 9.

The cell frames 36 and the intake and offtake frames 48, may be supported on the side bars 27 by similar but specifically different means. As shown in Fig. 7, the cell frames are provided on their outer vertical edges with angular lugs 97, secured to said frame by pins 98 which screw into tapped holes in the lugs and enter with a tight driving fit into holes drilled in the frame edges. Similarly, as shown in Fig. 8, the intake and offtake frames are provided with lugs 99 which are similar in all essential respects to the lugs provided on the cell frames, and are similarly held in place.

It is desirable to form all the described supporting lugs of some suitable insulating material, a hard horn fiber being suitable for the purpose.

Figure 10:
Fig. 10 is an edge view of the diaphragm frame.
Figure 11:
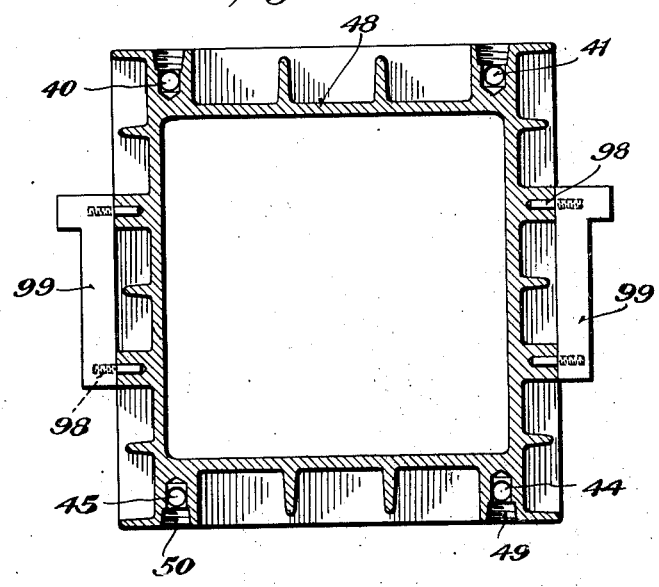
Fig. 11 is a section through one of the inlet and offtake frames.
Figure 12:
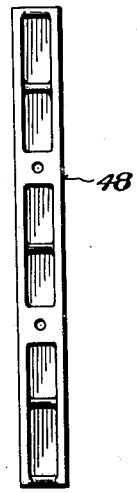
Fig. 12 is an edge view of such inlet and offtake frame.

In order to facilitate effective separation of gas from the liquid passing from the generator cells over into the separating tanks, I have found it advantageous to interpose between the offtake header discharge and the normal liquid level 71 in each tank a foraminous baffle member or screen device, which is indicated conventionally in dotted lines at 100 in Fig. 1 and is shown in greater detail in Fig. 10. The general purpose of the device is to break up the falling liquid in such a way that the entrained gas bubbles are readily disengaged and set free. This baffle device, or de-foamizer as it may be termed, may be of any form and construction suitable for the purpose in view, but the construction shown in Fig. 13 has certain practical advantages. As here shown, the baffle screen itself is formed of one or more thicknesses of wire cloth screen or gauze 101 preferably of Monel metal, marginally clamped between a pair of rings 102 suitably secured together. The screen is maintained at the proper level in the separating tank in any suitable manner. In this instance it is adjustably supported upon a frame composed of vertical rods 103 secured at their lower ends to a ring 104 serving as a base to rest upon the bottom of the tank. The upper portions of the rods 103 are threaded as indicated at 105 and extend through apertures provided in the rings 102; the ring being adjustably held at the proper height on said rods by pairs of nuts 106 disposed respectively above and below the rings. Said nuts also serve to clamp the two rings together with the screen between. Also clamped between said rings is a flexible ring or gasket 107 of rubber or the like sealing or packing the joint between the outer periphery of the screen rings 102 and the inner wall of the tank. For convenience in placing the baffle device and its supporting framework in the tank, or removing the same therefrom, eye bolts 108 may be anchored to the screen rings by pairs of nuts 109, arranged above and below said screen rings and also aiding in holding the rings firmly clamped together.

In operation, the baffle screen is effective in breaking up into fine particles the liquid falling thereupon from the offtake header discharge outlet above, and freeing entrained gas bubbles. In this way efficient separation of gases from the anolyte and catholyte is attained.

The operation of the apparatus having been described in explaining the construction of the various parts, no further description of the operation appears to be necessary except to note that current of the requisite voltage may be supplied from suitable mains through leads attached to positive and negative terminals 110 and 111, respectively at opposite ends of the cell series. It is of course obvious that various changes in structural details may be made without sacrificing the advantages attainable by the invention, and the invention is therefore to be understood as not restricted to the specific form of apparatus illustrated.

What I claim is:

1. Electrolytic apparatus comprising, in combination, a plurality of groups of cells assembled in a generator, inlet means and offtake means individual for each group but each serving all the cells of that group, and inlet and offtake headers to which said inlet means and offtake means are respectively connected.

2. Electrolytic apparatus comprising, in combination, a plurality of groups of cells assembled in a generator, inlet and offtake conduits for each group arranged within the cell structure, said conduits being individual for each group but each serving all the cells of that group, and inlet and offtake headers arranged outside the cell structure and to which said inlet and offtake conduits are respectively connected.

3. Electrolytic apparatus comprising, in combination, a plurality of cells assembled in a structurally unitary generator, said cells being divided into groups, each group constituting a unit of the filter press type, inlet and offtake headers each connected to all the groups by individual conduits each serving all the cells of one group only.

4. Electrolytic apparatus comprising, in combination, a plurality of cell-forming members, means compressing said members together into a unitary generator structure embodying a series of flat cells, a plurality of sets of inlet and offtake ducts formed by registering apertures in separate groups of said members, the ducts of each set being in communication with cell compartments of the corresponding group only, and separate inlet and offtake connections for the respective inlet and offtake ducts of each group.

5. Electrolytic apparatus comprising, in combination, a plurality of cell-forming members, means compressing said members together into a unitary generator structure embodying a series of flat cells, a plurality of sets of inlet and offtake ducts formed by registering apertures in separate groups of said members, the ducts of each set being in communication with cell compartments of the corresponding groups only, and spacing members interposed between the successive groups of cell-forming members, said spacing members being formed to provide individual inlet and offtake connections for the respective inlet and offtake ducts of each group.

6. Electrolytic apparatus comprising, in combination, a plurality of electrode-supporting plates, annular cell frames, and annular diaphragm-supporting frames, all having parallel plane bearing surfaces and assembled to form a plurality of cells, annular spacing members interposed at intervals in the assemblage and dividing the same into a plurality of cell groups, means compressing the whole into a unitary generator structure, a plurality of sets of inlet and offtake ducts, one set for each cell group, formed by registering apertures in the cell-forming members, the ducts of each set being in communication with the cell compartments of the corresponding group only, and passages formed in each of said spacing members affording communication between the respective ducts of each cell group and the outside of the generator.

7. Electrolytic apparatus comprising a plurality of cells assembled to form a generator, said cells having offtakes in their upper portions, offtake headers arranged at a level higher than said offtakes but not directly above said cells, said offtake being in direct communication with said headers.

8. Electrolytic apparatus comprising a plurality of groups of cells assembled to form a generator, each group having offtake means common to all cells of that group, and offtake headers extending longitudinally above said generator but outside of the vertical planes laterally bounding said cells, each of said offtake means being individually connected to said offtake headers.

9. Electrolytic apparatus comprising, in combination, cell means, separating chambers, conduit means whereby anolyte and catholyte are respectively conducted from said cell means into said chambers for separation of anodic and cathodic products, another chamber into which anolyte and catholyte separated in the separating chambers are conducted and in which they intermingle, and conduit means for supplying the resultant electrolyte mixture from the last mentioned chamber to said cell means.

10. Electrolytic apparatus for generating oxygen and hydrogen comprising, in combination, cell means, two separating tanks, conduit means for conducting anolyte and oxygen from said cell means into one of said tanks, and for conducting catholyte and hydrogen into the other tank, a third tank into which anolyte and catholyte separated in said separating tanks are conducted and in which they intermingle, and conduit means for supplying the resultant electrolyte mixture from said third tank to said cell means.

11. Electrolytic apparatus comprising, in combination, a plurality of cells assembled in an elongated generator structure, and a plurality of separating tanks connected therewith and disposed in tandem at one end of the cell assemblage, and with their centers substantially in the center line of said assemblage.

12. Electrolytic apparatus for producing oxygen and hydrogen comprising, in combination, cell means, and separating chambers for anodic and cathodic products, respectively, the chamber for cathodic products providing a larger gas-collecting space than the chamber for anodic products.

13. Electrolytic apparatus comprising, in combination, supporting means including parallel substantially horizontal side bars, and cell-forming members supported by lugs detachably secured to said members.

14. Electrolytic apparatus comprising, in combination, supporting means including parallel substantially horizontal side bars, and cell-forming members supported by lugs of insulating material detachably secured to said members.

15. In electrolytic apparatus, a cell-forming member provided on opposite edges with supporting lugs having a dowel-pin connection therewith.

16. In electrolytic apparatus, a cell-forming member provided on opposite edges with supporting lugs having a dovetail connection therewith.

17. Electrolytic apparatus comprising the combination, with cell means, separator means, and conduit means arranged to conduct electrolyte and gas from said cell means and discharge the same into said separator means above the normal liquid level therein, of foraminous partition means within said separator means interposed between the discharge of said conduit means and said normal liquid level.

18. In electrolytic apparatus, the combination with a gas and electrolyte separating tank, of a conduit arranged to discharge electrolyte thereinto above the normal liquid level therein, and a foraminous baffle within said tank interposed between the discharge of said conduit and said normal liquid level.

19. In electrolytic apparatus, the combination, with a gas and electrolyte separating tank, of a baffle device disposed therein, and gasket means arranged between said baffle device and the wall of said tank.

20. In electrolytic apparatus, the combination, with a gas and electrolyte separating tank, of a baffle device disposed therein, and means adjustable to support said baffle device in different positions within said tank.

21. In electrolytic apparatus, the combination, with a gas and electrolyte separating tank, of a baffle device disposed therein, and supporting means for said baffle device secured thereto and removable from the tank therewith.

22. In electrolytic apparatus, the combination, with a gas and electrolyte separating tank, of a baffle device and means resting on the bottom of said tank and supporting said baffle device at a distance above said bottom.

23. In electrolytic apparatus, the combination, with a gas and electrolyte separating tank, of a baffle device and means resting on the bottom of said tank and supporting said baffle device at a distance above said bottom, said baffle device being adjustable vertically upon said supporting means.

24. In electrolytic apparatus, the combination with a gas and electrolyte separating tank, of a foraminous partition dividing said tank transversely, a framework, including uprights, positioned within said tank, and means adjustably securing said partition to said uprights.

25. In electrolytic apparatus, the combination, with a tank having a removable cover, a baffle device, and means attached to said device for supporting the same above the bottom of the tank, such supporting means being removable with said baffle device as a unit when the tank cover is off.

26. In electrolytic apparatus, the combination, with a tank, a device located within the tank, said device comprising an annular rim, a foraminous baffle member marginally supported by said rim, a second annular rim, and rods connecting said rims and holding them spaced apart.

27. In electrolytic apparatus, the combination, with a tank, a device located within the tank, said device comprising a foraminous baffle member, of annular gasket means associated therewith and extending beyond the margin thereof, of a pair of rings clamping said baffle member and gasket means together.

28. In electrolytic apparatus the combination, with a tank, a device located within the tank, said device comprising a foraminous baffle member, of annular gasket means associated therewith and extending beyond the margin thereof, of a pair of rings clamping said baffle member and gasket means together, an annular base, and means supporting said rings on said base.

29. An electrolytic apparatus comprising, in combination, a cell having flat rectangular electrodes, an electrolyte circulatory system for said cell comprising an intake and an offtake duct for said cell located adjacent an electrode and spaced apart in a direction diagonal of its surface.

30. Electrolytic apparatus comprising a plurality of annular cell-forming members having marginal bearing faces and apertures therethrough adapted in one assembled position of said members in successive order to cooperate each with the other to form a plurality of serially related cells and with said apertures registering to form ducts for the passage therethrough of the electrolyte, a frame for mounting said assembly having alining elements, and alining insulating elements projecting from said cell forming members adapted to engage said first mentioned alining elements to locate said members in said one assembled position.

31. Electrolytic apparatus comprising a plurality of cells, said cells having offtakes in their upper portions, offtake headers arranged on a higher level than said offtakes, there being direct communicating means between the offtakes and the headers.

32. Electrolytic apparatus comprising a plurality of cells, said cells having offtakes in their upper portions, offtake headers arranged on a higher level than said offtakes but not directly above said offtakes, there being direct communicating means between the offtakes and the headers.

33. Electrolytic apparatus comprising, in combination, a plurality of annular cell frames having parallel bearing faces, a plurality of electrode-supporting plates and diaphragms marginally held in alternating arrangement between the bearing faces of said frames in proper spaced relation to form a series of co-operating cells within the space bounded by said frames, and means holding the parts properly assembled.

34. Electrolytic apparatus comprising, in combination, a plurality of annular metal cell frames having substantially plane parallel bearing faces, a plurality of metal electrode-supporting plates and diaphragms marginally clamped in alternating arrangement between said bearing faces in proper spaced relation to form a series of co-operating cells within the space bounded by said frames, means insulating said plates and diaphragms from said frames, and means holding the parts properly assembled.

35. Electrolytic apparatus comprising, in combination, a plurality of annular cell frames having substantially parallel plane bearing faces, the section of each frame being substantially a rectangle elongated in a direction parallel to said bearing faces, a plurality of diaphragms and metal cell wall plates marginally clamped in alternating arrangement between said bearing faces in proper spaced relation to form a plurality of serially related cells within the space bounded by said frames, and insulation separating said wall plates and diaphragms from said frames, said insulation covering the outer edges of said wall plates and diaphragms, and means holding the parts properly assembled.

36. Electrolytic apparatus comprising, in combination, a plurality of annular metal cell frames having co-operating bearing faces, a plurality of diaphragms and metal cell wall plates marginally clamped between said bearing faces in alternating arrangement and in proper spaced relation to form a plurality of serially related cells within the space bounded by said frames, sheet insulation folded around the outer edge and marginally clamped portion of each cell wall plate and diaphragm and between the same and the frames, and means holding the parts properly assembled.

37. Electrolytic apparatus comprising, in combination, a plurality of annular cell frames having bearing faces, and a plurality of diaphragms and electrode-supporting plates marginally clamped in alternating arrangement between said bearing faces, the joints being packed with resilient material.

38. Electrolytic apparatus comprising, in combination, a plurality of annular cell frames having bearing faces, a plurality of diaphragms and conductive cell wall plates marginally clamped in alternating arrangement between said bearing faces and in proper spaced relation to form serially related cells within the space bounded by said frames, said frames, diaphragms and plates being provided with sets of registering apertures, and assembling means extending through said sets of apertures.

39. Electrolytic apparatus comprising, in combination, a plurality of annular cell-forming members assembled in alternating arrangement with other cell-forming members to form a casing, and sheet insulating material separating the annular from the other cell-forming members and folded over the outer edges of said other cell-forming members.

40. Electrolytic apparatus comprising, in combination, cell means, and separating means arranged to receive gas and electrolyte from said cell means and affording separate collecting chambers of unequal capacity for anodic and cathodic gases, respectively.

41. Electrolytic appartus for generating oxygen and hydrogen comprising, in combination, cell means, separating means arranged to receive gas and electrolyte from said cell means and affording separate collecting chambers for oxygen and hydrogen, respectively, that for hydrogen being materially larger than that for oxygen.

42. Electrolytic apparatus comprising, in combination, cell means, separating means affording separate gas-collecting spaces of unequal capacity, and separate conduit means similarly unequal in capacity connecting said cell means and said separating means and arranged to deliver separately anodic and cathodic products from said cell means to said separating means.

43. Electrolytic apparatus comprising, in combination, a cell having cooperating vertically positioned electrodes having parallel surfaces of substantial extent measured in both a vertical and horizontal direction, an electrolyte circulatory system for said cell comprising a set of intakes and a set of offtakes vertically spaced apart, with the set of offtakes at the higher level, and with the intakes and offtakes spaced apart in their respective sets in a horizontal direction along an electrode surface.

44. Electrolytic apparatus, comprising a plurality of annular cell frames having parallel bearing faces, a plurality of electrode members and diaphragms in alternate arrangement, said electrode members and diaphragms being supported by engagement of the bearing faces of said frames, and means holding the parts properly assembled.

45. Electrolytic apparatus, comprising a plurality of annular cell frames having parallel bearing faces, a plurality of electrode members and diaphragms in alternate arrangement, said electrode members and diaphragms being supported by engagement of the bearing faces of said frames in proper spaced relation to form a series of co-operating cells within the space bounded by said frames, and means holding the parts properly assembled.

46. Electrolytic apparatus, comprising a plurality of annular cell frames having parallel bearing faces, a plurality of electrode members and diaphragms in alternate arrangement, said electrode members and diaphragms being supported by engagement of the bearing faces of said frames in proper spaced relation to form a series of co-operating cells within the space bounded by said frames said electrode members forming liquid-proof partitions, and means holding the parts properly assembled.

47. Electrolytic apparatus, comprising a plurality of annular cell frames marginally clamping a plurality of alternately arranged electrode members and diaphragms in proper spaced relation to form serially related cells each comprising an anode compartment and a cathode compartment, there being an opening in each cell frame whereby anodic products may be removed from the anode compartments and cathodic products may be removed from the cathode compartments.

48. Electrolytic apparatus, comprising a plurality of annular cell frames marginally clamping a plurality of alternately arranged electrode members and diaphragms in proper spaced relation to form serially related cells each comprising an anode compartment and a cathode compartment, there being an opening in each cell frame whereby electrolyte may be admitted to each compartment.

49. Electrolytic apparatus, comprising a plurality of annular cell frames marginally clamping a plurality of alternately arranged electrode members and diaphragms in proper spaced relation to form serially related cells each comprising an anode compartment and a cathode compartment, there being an opening in each cell frame whereby anodic products may be removed from the anode compartments and cathodic products may be removed from the cathode compartments, there being an opening in each frame whereby electrolyte may be admitted to each compartment.

50. Electrolytic apparatus, comprising a plurality of annular cell frames having parallel bearing faces, a plurality of diaphragms spaced apart by said frames and being supported by engagement of the bearing faces thereof, structurally separate electrodes in alternate arrangement relatively to the diaphragm members, means for supporting said electrodes within said annular frames, and means for holding the parts properly assembled.

51. Electrolytic apparatus, comprising a plurality of annular frame members arranged end to end to form a cell, structurally separate members spaced apart within the cell and dividing the same into a plurality of compartments, electrode elements carried by said dividing members, diaphragm members alternating with and spaced from said dividing members, and means for holding the parts properly assembled.

52. Electrolytic apparatus, comprising a plurality of annular frame members arranged end to end to form a cell, structurally separate members spaced apart within the cell and dividing the same into a plurality of compartments, electrode elements carried by said dividing members, diaphragm members alternating with and spaced from said dividing members, said diaphragm members being supported by engagement between said frame members, and means for holding the parts properly assembled.

In testimony whereof I hereunto affix my signature.

WILLIAM GEORGE ALLAN.